United States Patent
Buchan et al.

(10) Patent No.: US 10,047,480 B2
(45) Date of Patent: Aug. 14, 2018

(54) METHOD FOR PRODUCING CORRUGATED CARDBOARD

(71) Applicant: BASF SE, Ludwigshafen (DE)

(72) Inventors: Matthew Buchan, Limburgerhof (DE); Reinhard Haffke, Weener (DE); Guido Rensen, Didam (NL); Christoph Hamers, Ludwigshafen (DE); Norbert Schall, Roemerberg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/129,986

(22) PCT Filed: Mar. 10, 2015

(86) PCT No.: PCT/EP2015/054987
§ 371 (c)(1),
(2) Date: Sep. 28, 2016

(87) PCT Pub. No.: WO2015/144428
PCT Pub. Date: Oct. 1, 2015

(65) Prior Publication Data
US 2017/0183821 A1  Jun. 29, 2017

(30) Foreign Application Priority Data

Mar. 28, 2014 (EP) ..................... 14162385

(51) Int. Cl.
| | |
|---|---|
| D21H 17/28 | (2006.01) |
| D21H 17/42 | (2006.01) |
| D21H 17/45 | (2006.01) |
| D21H 17/56 | (2006.01) |
| D21H 19/54 | (2006.01) |
| D21H 21/18 | (2006.01) |
| D21H 17/37 | (2006.01) |
| B65D 5/56 | (2006.01) |

(52) U.S. Cl.
CPC ............ *D21H 17/28* (2013.01); *B65D 5/563* (2013.01); *D21H 17/375* (2013.01); *D21H 17/42* (2013.01); *D21H 17/45* (2013.01); *D21H 17/56* (2013.01); *D21H 19/54* (2013.01); *D21H 21/18* (2013.01)

(58) Field of Classification Search
None
See application file for complete search history.

(56) References Cited

U.S. PATENT DOCUMENTS 4,940,514 A * 7/1990 Stange ............... D21H 17/28
                                                 162/168.2
2009/0145566 A1 6/2009 Esser et al.
(Continued)

FOREIGN PATENT DOCUMENTS

DE    35 06 832 A1    8/1986
EP    0 377 313 A2    7/1990
(Continued)

OTHER PUBLICATIONS

U.S. Appl. No. 15/035,959, filed May 11, 2016, US 2016-0265162, Holger Kern et al.
(Continued)

*Primary Examiner* — Erma C Cameron
(74) *Attorney, Agent, or Firm* — Oblon, McClelland, Maier & Neustadt, L.L.P.

(57) ABSTRACT

The present invention relates to a process for producing corrugated fiberboard from plies of paper which each have a grammage of 70 to 200 g/m² and of which at least one ply of paper is obtained by a process comprising the addition of
(A) 0.25 to 5 wt %, based on dry paper stock, of at least one cationic polymer comprising vinylamine units, and
(B) 0 to 5 wt %, based on dry paper stock, of at least one polymeric anionic compound,
to a paper stock, draining the paper stock by sheet formation, coating the paper web obtained with
(C) 0.1 to 3 wt %, based on dry paper stock, of at least one starch
and drying the coated paper web,
wherein the polymeric anionic compound is selected from a polymeric anionic compound (B1) and a polymeric anionic compound (B2),
wherein said polymeric anionic compound (B1) is obtainable by copolymerizing a monomer mixture comprising, preferably consisting of,
(a) at least one monomer (a) selected from acrylamide and an N-vinylcarboxamide of the formula

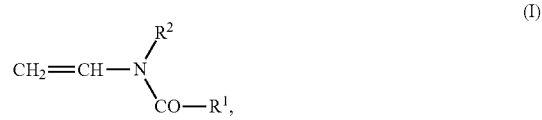

(I)

where $R^1$ and $R^2$ are each H or $C_1$ to $C_6$ alkyl,
(b) at least one acid-functional monoethylenically unsaturated monomer and/or its alkali metal, alkaline earth metal or ammonium salts (b), and
(c) optionally one or more monoethylenically unsaturated compounds (c) other than said monomers (a) and (b), and
(d) optionally one or more compounds having at least two ethylenically unsaturated double bonds in the molecule, and said polymeric anionic compound (B2) is the hydrolysis product of said polymeric anionic compound (B1) whose carboxamide moieties have been partly or wholly hydrolyzed into amino groups,
and also the corrugated fiberboard thus obtained and its use in the manufacture of packaging boxes from corrugated fiberboard.

10 Claims, No Drawings

(56) References Cited

U.S. PATENT DOCUMENTS

2010/0108279 A1 5/2010 Schall et al.
2011/0132559 A1 6/2011 Haehnle et al.
2011/0308752 A1* 12/2011 Esser .................... D21H 17/42
                                                                                  162/164.6

FOREIGN PATENT DOCUMENTS

| EP | 0 438 744 A1 | 7/1991 |
| EP | 0 672 212 | 9/1995 |
| JP | 11-140787 A | 5/1999 |
| WO | 10 2004 056 551 A1 | 5/2006 |
| WO | WO 2006/056381 A1 | 6/2006 |
| WO | WO 2006/075115 A2 | 7/2006 |
| WO | WO 2007/104716 A1 | 9/2007 |
| WO | WO 2010/020551 A1 | 2/2010 |

OTHER PUBLICATIONS

International Search Report dated Jun. 19, 2015, in PCT/EP15/54987 filed Mar. 10, 2015.

* cited by examiner

METHOD FOR PRODUCING CORRUGATED CARDBOARD

The invention relates to a process for producing corrugated fiberboard from plies of paper which each have a grammage of 70 to 200 g/m² and of which at least one ply of paper is obtained by a process comprising the addition of
(A) 0.25 to 5 wt %, based on dry paper stock, of at least one cationic polymer comprising vinylamine units, and
(B) 0 to 5 wt %, based on dry paper stock, of at least one polymeric anionic compound,
to a paper stock, draining the paper stock by sheet formation, coating the paper web obtained with
(C) 0.1 to 3 wt %, based on dry paper stock, of at least one starch
and drying the coated paper web,
wherein the polymeric anionic compound is selected from a polymeric anionic compound (B1) and a polymeric anionic compound (B2),
wherein said polymeric anionic compound (B1) is obtainable by copolymerizing a monomer mixture comprising, preferably consisting of,
(a) at least one monomer (a) selected from acrylamide and an N-vinylcarboxamide of the formula

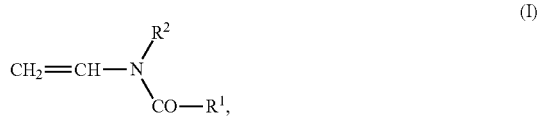

where $R^1$ and $R^2$ are each H or $C_1$ to $C_6$ alkyl,
(b) at least one acid-functional monoethylenically unsaturated monomer and/or its alkali metal, alkaline earth metal or ammonium salts (b), and
(c) optionally one or more monoethylenically unsaturated compounds (c) other than said monomers (a) and (b), and
(d) optionally one or more compounds having at least two ethylenically unsaturated double bonds in the molecule,
and said polymeric anionic compound (B2) is the hydrolysis product of said polymeric anionic compound (B1) whose carboxamide moieties have been partly or wholly hydrolyzed into amino groups.

The present invention further relates to the corrugated fiberboard thus obtained and also to its use in the manufacture of packaging boxes from corrugated fiberboard.

It is common general knowledge to add cationic starch as an additive to the pulp furnish, i.e., to the paper stock. The site of this addition to the paper stock is located upstream of the headbox of the papermaking machine. Starch added to the pulp furnish, i.e., the fibrous material, will hereinafter be referred to as internal starch.

It is further known to produce paper of high dry strength by applying dilute aqueous solutions of cooked starch or of synthetic polymers to the surface of ready-dried paper, which each act as dry strength enhancers. Starch applied to the surface of a paper web is often referred to as surface starch among those skilled in the art.

JP-A 1999-140787 relates to a process for producing corrugated fiberboard wherein, to improve the strength properties of a paper-based product, the paper stock is admixed with from 0.05 to 0.5 wt %, based on dry paper stock, of a polyvinylamine obtainable by from 25 to 100% hydrolysis of polyvinylformamide, in combination with an anionic polyacrylamide, then drained and dried.

WO 2006056381 teaches a process for producing paper, card and board of high dry strength by separate admixture of a cationic polyvinylamine and of an anionic copolymer to the paper stock, wherein the anionic copolymer is obtained by polymerizing an N-vinylcarboxamide and an acid-functional monoethylenically unsaturated monomer.

Corrugated fiberboard is usually produced using 70 to 200 g/m² grammage paper whose paper stock was admixed with from 0.1 to 4 wt % (based on dry paper stock) of a dry strength agent before drainage by sheet formation, and which was subsequently coated with surface starch. The surface starch is typically used at from 4 to 6 wt %. The paper grammage determines the stability of the corrugated fiberboard and, depending on the stability requirements, that of the boxes obtainable therefrom. This has to be viewed in the context of the ever-present concern to reduce material and input requirements in order to spare the natural resources. One problem addressed by the present invention was therefore that of reducing the amount of surface starch while keeping the strength of the corrugated fiberboard the same. The present invention accordingly had an improved process for producing corrugated fiberboard as its object.

The invention accordingly provides the abovementioned process and the corrugated fiberboard obtainable thereby and also its employment in the manufacture of packaging boxes. It was found to be possible to use corrugated fiberboard of the present invention at reduced grammage compared with conventional corrugated fiberboard in the same corrugated fiberboard use for packaging of a given load resistance capability. It was further found that when the corrugated fiberboard of the present invention and the conventional corrugated fiberboard are compared at the same grammage, the corrugated fiberboard of the invention is suitable for uses requiring a higher load resistance capability.

Paper stock (also known as pulp furnish) hereinafter refers to a mixture of water and fibrous material and further comprises, depending on the stage in the papermaking operation, the cationic polymer comprising vinylamine units, the polymeric anionic compound, filler and optionally paper auxiliaries. Dry paper stock is to be understood as meaning the overall paper stock of fibrous material, cationic polymer comprising vinylamine units, the polymeric anionic compound, filler and optionally paper auxiliaries without water (paper stock solids).

Papers which are starting paper for producing corrugated fiberboard are often also referred to as test liner, corrugated raw material, corrugated base paper, corrugated fiberboard raw material or corrugated fiberboard central ply paper.

The process of the present invention is used for producing corrugated fiberboard comprising the step of using a generally filler-containing paper stock. The filler content of the paper used according to the present invention is generally 1-20 wt %, preferably from 5 to 20 wt % and especially 10-15 wt % based on dry paper stock. Filler, as usual in the papermaking arts, is to be understood as meaning inorganic pigment.

The fibrous material used according to the present invention may comprise virgin and/or recovered fibers. Any softwood or hardwood fiber typically used in the paper industry may be used, examples being unbleached chemical pulp and also fibrous materials from any annual plants. Mechanical pulp includes for example groundwood, thermomechanical pulp (TMP), chemithermomechanical pulp (CTMP), pressure groundwood, semichemical pulp, high-yield pulp and refiner mechanical pulp (RMP). Sulfate, sulfite and soda chemical pulps may be used for example.

Suitable annual plants for producing fibrous materials include, for example, rice, wheat, sugarcane and kenaf.

The pulp furnishes are preferably produced using waste paper, which is either used alone or in admixture with other fibrous materials.

In the case of waste paper, a fibrous material having a freeness of 20 to 50 SR may be used. The general rule is to use a fibrous material having a freeness of about 40 SR, which is beaten during pulp furnish production. Preference is given to using fibrous material having a freeness of ≤40 SR.

Cationic polymers comprising vinylamine units are soluble in water. The solubility in water under standard conditions (20° C., 1013 mbar) and pH 7.0 is, for example, at least 5 wt %, preferably at least 10 wt %.

Cationic polymers comprising vinylamine units are cationic by virtue of their amino group. Cationic polymers comprising vinylamine units have a charge density (without counter-ion) of at least 1.0 meq/g and preferably in the range from 4 to 10 meq/g.

The average molecular weight of cationic polymers comprising vinylamine units is typically in the range from 10 000 to 10 000 000 daltons, preferably in the range from 20 000 to 5 000 000 daltons and more preferably in the range from 40 000 to 3 000 000 daltons.

Cationic polymers comprising vinylamine units are known, cf. the prior art documents DE 35 06 832 A1 and DE 10 2004 056 551 A1.

Cationic polymer comprising vinylamine units which is used according to the present invention comprises, for example, the reaction products obtainable by polymerizing
(a) at least one monomer of the formula

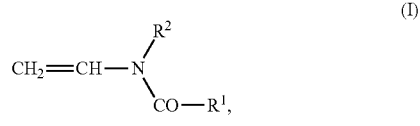

where $R^1$ and $R^2$ are each H or $C_1$ to $C_6$ alkyl,
(c) optionally one or more monoethylenically unsaturated monomers other than said monomers (a) and
(d) optionally one or more compounds having at least two ethylenically unsaturated double bonds in the molecule,
and then partially or completely hydrolyzing the monomer (I) units polymerized into the polymer, to form amino groups,
and/or the cationic polymer comprising vinylamine units is obtainable by Hofmann degradation of polymers having acrylamide and/or methacrylamide units.

Hydrolyzing the carboxamide moieties of polymerized monomer (I) units converts the $-NR^2-CO-R^1$ group into the $-NR^2-H$ group. Examples of group (a) monomers include N-vinylformamide, N-vinyl-N-methylformamide, N-vinylacetamide, N-vinyl-N-methylacetamide, N-vinyl-N-ethylacetamide, N-vinyl-N-methylpropionamide and N-vinylpropionamide. The monomers of group (a) may be used singly or mixed in the copolymerization with the monomers of the other groups.

The copolymers may optionally comprise modifying monomers of group (c) in polymerized form, examples being esters of ethylenically unsaturated $C_3$ to $C_5$ carboxylic acids such as methyl acrylate, ethyl acrylate, n-butyl acrylate, isobutyl acrylate, isobutyl methacrylate, methyl methacrylate, ethyl methacrylate and also vinyl esters, e.g. vinyl acetate or vinyl propionate, or other monomers such as N-vinylpyrrolidone, N-vinylimidazole, acrylamide and/or methacrylamide.

The copolymers may be further modified by using monomers (d), comprising at least two double bonds in the molecule, in the copolymerization, examples being methylenebisacrylamide, glycol diacrylate, glycol dimethacrylate, glycerol triacrylate, triallylamine, pentaerythritol triallyl ether, at least doubly acrylated and/or methacrylated polyalkylene glycols or polyols such as pentaerythritol, sorbitol or glucose. When at least one monomer of group (d) is used in the copolymerization, the amounts employed range up to 2 mol %, for example from 0.001 to 1 mol %.

By way of cationic polymer comprising vinylamine units it is preferable to use an at least 10 mol % hydrolyzed homopolymer of N-vinylformamide. Polyvinylamine or at least 50 mol % hydrolyzed homopolymers of N-vinylformamide are preferably employed as cationic polymer comprising vinylamine units in the process of the present invention.

A further embodiment preferably utilizes reaction products obtainable by copolymerizing
(1.) N-vinylformamide and
(2.) acrylonitrile
and then eliminating formyl groups from the polymerized vinylformamide units in the copolymer to leave amino groups.

The papers employed according to the present invention are also obtainable by using amphoteric copolymers as cationic polymer comprising vinylamine units provided said amphoteric copolymers have at least 10 mol % more cationic than anionic groups. Amphoteric polymers of this type are obtainable, for example, by copolymerizing
(a) at least one N-vinylcarboxamide of the formula

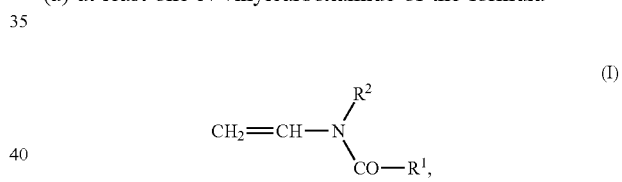

where $R^1$ and $R^2$ are each H or $C_1$ to $C_6$ alkyl, and
(b) at least one acid-functional monoethylenically unsaturated monomer and/or its alkali metal, alkaline earth metal or ammonium salts, and
(c) optionally one or more monoethylenically unsaturated monomers other than said monomers (a) and (b), and
(d) optionally one or more compounds having at least two ethylenically unsaturated double bonds in the molecule,
and then partially or completely hydrolyzing the monomer I units polymerized into the polymer, to form amino groups, while the proportion of amino groups in the copolymer is at least 10 mol % greater than the proportion of units derived from acid-functional monoethylenically unsaturated monomers.

Examples of group (a) monomers include those mentioned above.

Useful group (b) monomers include particularly monoethylenically unsaturated carboxylic acids having 3 to 8 carbon atoms and also the water-soluble salts thereof. This group of monomers includes, for example, acrylic acid, methacrylic acid, dimethacrylic acid, ethacrylic acid, maleic acid, fumaric acid, itaconic acid, citraconic acid, methylenemalonic acid, allylacetic acid, vinylacetic acid and crotonic acid. Useful group (b) monomers also include sulfonated monomers such as vinylsulfonic acid, acrylamido-2-methylpropanesulfonic acid and styrene-sulfonic acid, and also vinylphosphonic acid. The monomers of this group may be used in the copolymerization singly or mixed with one another, in partially neutralized form or in completely neutralized form. Neutralization is effected, for example, with alkali metal or alkaline earth metal bases, ammonia, amines and/or alkanolamines. Examples thereof are aqueous sodium hydroxide solution, aqueous potassium hydroxide solution, sodium carbonate, potassium carbonate, sodium bicarbonate, magnesium oxide, calcium hydroxide, calcium oxide, triethanolamine, ethanolamine, morpholine, diethylenetriamine or tetraethylenepentamine. The monomers of group (b) are preferably used in the copolymerization in partially neutralized form.

The copolymers may optionally comprise modifying monomers of group (c) in polymerized form. Examples of these monomers include the abovementioned monomers of group (c).

Useful compounds having at least two ethylenically unsaturated double bonds in the molecule include for example the abovementioned monomers (d).

When at least one monomer of group (d) is used in the copolymerization, the amount employed ranges up to 2 mol %, for example from 0.001 to 1 mol %.

The above-described cationic homo- and copolymers comprising vinylamine units are obtainable by solution, precipitation, suspension or emulsion polymerization. Solution polymerization in aqueous media is preferable. Suitable aqueous media include water and mixtures of water and at least one water-miscible solvent, for example an alcohol, such as methanol, ethanol, n-propanol or isopropanol.

The monomers are copolymerized in a known manner in the presence of free-radical polymerization initiators and in the optional presence of chain transfer agents, cf. EP-B 672 212 page 4 lines 13-37 or EP-A 438 744 page 2 line 26 to page 8 line 18.

The copolymers may be hydrolyzed in the presence of acids or bases or else enzymatically. When the hydrolysis is carried out with acids, the vinylamine groups formed from the vinyl-carboxamide units are in salt form. The hydrolysis of vinylcarboxamide copolymers is exhaustively described in EP-A 0 438 744 page 8 line 20 to page 10 line 3. The particulars provided therein apply mutatis mutandis to the preparation of the purely cationic and/or amphoteric vinylamine polymers having a net cationic charge which are useful for the purposes of the present invention. The cationic polymers comprising vinylamine units can also be used in the form of the free bases. Polymers of this type are generated, for example, in the base hydrolysis of polymers comprising vinylcarboxylic acid units.

Cationic polymers comprising vinylamine units have, for example, K-values (determined after H. Fikentscher in 5% aqueous sodium chloride solution at pH 7, a polymer concentration of 0.5 wt % and a temperature of 25° C.) in the range from 20 to 250, preferably from 50 to 150.

Useful cationic polymers comprising vinylamine units further include the reaction products obtainable by Hofmann degradation of homo- or copolymers of acrylamide or of methacrylamide in an aqueous medium in the presence of aqueous sodium hydroxide solution and sodium hypochlorite and subsequent decarboxylation of the carbamate groups of the conversion products in the presence of an acid. Polymers of this type are known from EP-A 0 377 313 and WO 2006/075115 for example. The preparation of polymers comprising vinylamine groups is for example exhaustively treated in WO 2006/075115 page 4 line 25 to page 10 line 22 and in the Examples on pages 13 and 14. The particulars provided therein apply to the characterization of the cationic polymers obtained by Hofmann degradation, comprising vinylamine units.

The starting materials are polymers comprising acrylamide and/or methacrylamide units. Homo- and/or copolymers of acrylamide and methacrylamide are concerned. Useful comonomers include, for example, dialkylaminoalkyl(meth) acrylamides, diallylamine, methyldiallylamine, salts of the amines and also the quaternized amines. Useful comonomers further include dimethyldiallylammonium salts, acrylamidopropyltrimethylammonium chloride and/or methacrylamidopropyltrimethylammonium chloride, N-vinylformamide, N-vinylacetamide, N-vinylpyrrolidone, vinyl acetate and acrylic and methacrylic esters. Useful comonomers optionally also include anionic monomers such as acrylic acid, methacrylic acid, maleic anhydride, maleic acid, itaconic acid, acrylamidomethylpropanesulfonic acid, methallylsulfonic acid and vinylsulfonic acid and also the alkali metal, alkaline earth metal and ammonium salts of the acidic monomers mentioned, although not more than 5 mol % of these monomers are used in the polymerization. The amount of water-insoluble monomers used in the polymerization is chosen such that the polymers obtained are soluble in water.

Useful comonomers optionally also include crosslinkers, for example ethylenically unsaturated monomers comprising at least two double bonds in the molecule, such as triallylamine, methylenebisacrylamide, ethylene glycol diacrylate, ethylene glycol dimethacrylate, polyethylene glycol dimethacrylate, triallylamine and trimethylol trimethacrylate. When a crosslinker is employed, the amounts used range for example from 5 to 5000 ppm. The monomers may be polymerized by any known process, for example by free-radically initiated solution, precipitation or suspension polymerization. The presence of customary chain transfer agents during the polymerization is optional.

Hofmann degradation proceeds for example from 20 to 40 wt % aqueous solutions of at least one polymer comprising acrylamide and/or methacrylamide units. The ratio of alkali metal hypochlorite to (meth)acrylamide units in the polymer is determinative for the resultant level of amine groups in the polymer. The molar ratio of alkali metal hydroxide to alkali metal hypochlorite is for example in the range from 2 to 6 and preferably in the range from 2 to 5. A particular amine group level in the degraded polymer is used to compute the amount of alkali metal hydroxide required to degrade the polymer.

The Hofmann degradation of the polymer is carried out, for example, in the temperature range from 0 to 45° C., preferably 10 to 20° C., in the presence of quaternary ammonium salts as a stabilizer in order to prevent any secondary reaction of the resultant amino groups with the amide groups of the starting polymer. After the reaction with aqueous alkali metal hydroxide solution/alkali metal hypochlorite has ended, the aqueous reaction solution is routed into a reactor comprising an initial charge of an acid for decarboxylating the conversion product. The pH of the reaction product comprising vinylamine units is adjusted to a value in the range from 2 to 7. The concentration of the degradation product comprising vinylamine units is for example more than 3.5 wt %, usually above 4.5 wt %. The aqueous polymer solutions may be concentrated by ultrafiltration for example.

The amount in which cationic polymer (A) comprising vinylamine units is used for producing the paper employed according to the present invention is for example in the range from 0.25 to 5 wt %, preferably in the range from 0.5 to 1.5 wt % and more preferably in the range from 1 to 1.5 wt %, all based on dry paper stock.

The polymeric anionic compounds are soluble in water. The solubility in water under standard conditions (20° C., 1013 mbar) and pH 7.0 is for example at least 5 wt %, preferably at least 10 wt %

The polymeric anionic compounds bear acid groups. The anionic charge density of the polymeric anionic compounds (without counter-ion) is at least −1.0 meq/g and is preferably in the range from −4 to −10 meq/g.

The average molar mass $M_w$ of the polymeric anionic compound is for example in the range from 30 000 daltons to 10 million daltons, preferably in the range from 100 000 daltons to 1 million daltons. These polymers have for example K values (determined after H. Fikentscher in 5% aqueous sodium chloride solution at pH 7, a polymer concentration of 0.5 wt % and a temperature of 25° C.) in the range from 20 to 250, preferably from 50 to 150.

The polymeric anionic compound is obtainable by copolymerizing a monomer mixture comprising, preferably consisting of,
(a) at least one monomer selected from acrylamide and an N-vinylcarboxamide of the formula

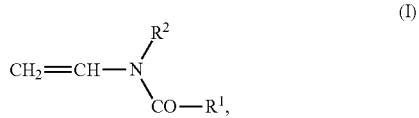

where $R^1$ and $R^2$ are each H or $C_1$ to $C_6$ alkyl, and
(b) at least one acid-functional monoethylenically unsaturated monomer and/or its alkali metal, alkaline earth metal or ammonium salts, and
(c) optionally one or more monoethylenically unsaturated monomers other than said monomers (a) and (b), and
(d) optionally one or more compounds having at least two ethylenically unsaturated double bonds in the molecule.

Copolymerizing monomers (a) and (b) or (a), (b) and (c) in the presence of a compound (d) gives branched copolymers. The quantitative ratios and reaction conditions here must be chosen such that the polymers obtained are still soluble in water. To achieve this, it may possibly be necessary to use chain transfer agents. Any known chain transfer agents such as thiols, secondary alcohols, sulfites, phosphites, hypophosphites, thioacids, aldehydes, etc. may be used (further particulars are found for example in EP-A 438 744 page 5 lines 7-12).

The branched copolymers comprise for example
(a) 10 to 95 mol % of units of formula I,
(b) 5 to 90 mol % of units of an acid-functional monoethylenically unsaturated monomer and/or of its alkali metal, alkaline earth metal or ammonium salts,
(c) 0 to 30 mol % of units of at least one monoethylenically unsaturated monomer other than monomers (a) and (b), and
(d) 0 to 2 mol %, preferably 0.001 to 1 mol % of units of at least one compound having at least two ethylenically unsaturated double bonds
in polymerized form.

Examples of group (a) monomers include the (a) monomers mentioned for preparing the cationic polymers comprising vinylamine units.

Acrylamide is further useful as monomer (a).

Useful group (b) monomers include in particular the (b) monomers used above for preparing the cationic polymers comprising vinylamine units.

The copolymers may optionally comprise modifying monomers of group (c) in polymerized form, for example esters of ethylenically unsaturated $C_3$ to $C_5$ carboxylic acids such as methyl acrylate, ethyl acrylate, n-butyl acrylate, isobutyl acrylate, isobutyl methacrylate, methyl methacrylate, ethyl methacrylate and also vinyl esters, e.g., vinyl acetate or vinyl propionate, or other monomers such as N-vinylpyrrolidone and N-vinylimidazole.

Useful group (d) monomers include the (d) monomers used above for the cationic polymers comprising vinylamine units.

The monomers are polymerized in a known manner in the presence of free-radical polymerization initiators and in the optional presence of chain transfer agents, cf. EP-B 672 212 page 4 lines 13-37 or EP-A 438 744 page 2 line 26 to page 8 line 18.

Preferably, the polymeric anionic compound used is an anionic polymer obtainable by copolymerizing
(a1) N-vinylformamide,
(b1) at least one monomer selected from acrylic acid, methacrylic acid and the alkali metal or ammonium salts of acrylic or methacrylic acid, and
(c1) optionally one or more monoethylenically unsaturated monomers other than the monomers of groups (a) and (b).

The polymeric anionic compound comprises for example
(a) 10 to 95 mol % of units of formula I,
(b) 5 to 90 mol % of units of a monoethylenically unsaturated carboxylic acid having 3 to 8 carbon atoms in the molecule and/or of its alkali metal, alkaline earth metal or ammonium salts, and
(c) 0 to 30 mol % of units of at least one monoethylenically unsaturated monomer other than the monomers of groups (a) and (b).

The polymeric anionic compound used is preferably an anionic copolymer obtainable by copolymerizing
(a2) 50 to 90 mol % of N-vinylformamide,
(b2) 10 to 50 mol % of at least one monomer selected from acrylic acid, methacrylic acid and the alkali metal or ammonium salts of acrylic or methacrylic acid, and
(c2) 0 to 30 mol % of at least one monoethylenically unsaturated monomer other than the monomers of groups (a) and (b).

The polymeric anionic compound used is more preferably an anionic copolymer of acrylamide.

Preference for use as polymeric anionic compound is given to copolymers obtainable by copolymerizing a monomer mixture comprising, preferably consisting of,
(a1) acrylamide,
(b1) acrylic acid, methacrylic acid and/or alkali metal or ammonium salts of acrylic or methacrylic acid, and
(c1) optionally one or more monoethylenically unsaturated monomers other than the monomers of groups (a) and (b).

The polymeric anionic compound comprises for example
(a) 10 to 95 mol % of units of acrylamide,
(b) 5 to 90 mol % of units of a monoethylenically unsaturated carboxylic acid having 3 to 8 carbon atoms in the molecule and/or of its alkali metal, alkaline earth metal or ammonium salts, and
(c) 0 to 30 mol % of units of at least one monoethylenically unsaturated monomer other than the monomers of groups (a) and (b).

Particular preference for use as polymeric anionic compound is given to anionic copolymers of acrylamide with a compound selected from acrylic acid, methacrylic acid and the alkali metal or ammonium salts of acrylic or methacrylic acid, preferably anionic copolymers of acrylamide with acrylic acid.

These anionic copolymers comprise in general at least 30 wt %, preferably at least 40 wt % and more preferably at least 50 wt % and generally at most 90 wt %, preferably at most 85 wt % and more preferably at most 80 wt % of acrylamide, based on the overall weight of the monomers, in polymerized form.

These anionic copolymers comprise in general at least 70 wt %, preferably at least 60 wt % and more preferably at least 40 wt % and also generally at most 10 wt %, preferably at most 15 wt % and more preferably at most 20 wt % of a compound selected from acrylic acid, methacrylic acid and alkali metal or ammonium salts thereof, preferably acrylic acid, in polymerized form, based on the overall weight of the monomers.

Particular preference for use as polymeric anionic compound is given to acrylamide/acrylic acid copolymers having an acrylamide/acrylic acid molar ratio of 70/30.

The polymeric anionic compound may also comprise amphoteric copolymers having a net anionic charge which are obtainable by copolymerizing
(a) at least one monomer selected from acrylamide and an N-vinylcarboxamide of the formula

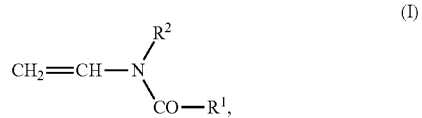

where R1 and R2 are each H or $C_1$ to $C_6$ alkyl, and
(b) at least one monoethylenically unsaturated carboxylic acid having 3 to 8 carbon atoms in the molecule and/or alkali metal, alkaline earth metal or ammonium salts thereof, and optionally
(c) other monoethylenically unsaturated monomers other than said monomers (a) and (b), and optionally
(d) compounds having at least two ethylenically unsaturated double bonds in the molecule,
and then detaching some —CO—$R^1$ groups from the formula I monomers polymerized into the copolymer, to leave amino groups, while the level of amino groups in the copolymer is at least 5 mol % below the level of polymerized acid groups of monomers (b). The hydrolysis of N-vinylcarboxamide polymers generates amidine units in a secondary reaction where vinylamine units react with an adjacent vinylformamide unit. In what follows, the reference to vinylamine units in the amphoteric copolymers is always to be understood as the sum total of vinylamine and amidine units.

The amphoteric compounds thus obtainable comprise for example
(a) 10 to 95 mol % of units of formula I,
(b) 5 to 90 mol % of units of an acid-functional monoethylenically unsaturated monomer and/or of its alkali metal, alkaline earth metal or ammonium salts,
(c) 0 to 30 mol % of units of at least one monoethylenically unsaturated monomer other than monomers (a) and (b),
(d) 0 to 2 mol % of units of at least one compound having at least two ethylenically unsaturated double bonds, and
(e) 0 to 42 mol % of vinylamine units in polymerized form, while the level of amino groups in the copolymer is at least 5 mol % below the level of copolymerized acid-functional monomers (b).

The anionic copolymers may be hydrolyzed in the presence of acids or bases or else enzymatically. When the hydrolysis is carried out with acids, the vinylamine groups formed from the vinylcarboxamide units are in salt form.

The hydrolysis of vinylcarboxamide copolymers is exhaustively described in EP-A 438 744 page 8 line 20 to page 10 line 3. The particulars provided therein apply mutatis mutandis to the preparation of amphoteric polymers to be used according to the present invention.

The amount in which the polymeric anionic compound is used in the process of the present invention is for example in the range from 0.01 to 2.0 wt %, preferably in the range from 0.05 to 1.0 wt % and especially in the range from 0.1 to 0.5 wt %, based on dry paper stock. The weight ratio of the cationic polymer comprising vinylamine units to the polymeric anionic compound in the preferred case of employing the polymeric anionic compound is for example in the range from 3:1 to 1:3 and is preferably equal to 1:1.

The process of the present invention preferably comprises the cationic polymer comprising vinylamine units being added first to the paper stock. The cationic polymer comprising vinylamine units may in fact be added to the thick stuff (fiber concentration>15 g/l, for example in the range from 25 to 40 g/l up to 60 g/l) or preferably to a thin stuff (fiber concentration<15 g/l, for example in the range from 5 to 12 g/l). The point of addition is preferably located upstream of the wires, but may also be located between a shearing stage and a screen or downstream thereof.

The polymeric anionic compound is usually only added to the paper stock after the cationic polymer comprising vinylamine units has been added, but may also be added to the paper stock at the same time as but separately from the cationic polymer comprising vinylamine units. It is further also possible to add the anionic component first and the cationic component thereafter.

The time during which the cationic polymer comprising vinylamine units and/or the polymeric anionic compound acts or act on a purely fibrous/paper stock material from the time of addition to the time of sheet formation is for example in the range from 0.5 seconds to 2 hours, preferably in the range from 1.0 seconds to 15 minutes and more preferably in the range from 2 to 20 seconds.

In addition to the cationic polymer comprising vinylamine units and the polymeric anionic compound, the paper stock may optionally be admixed, generally at a concentration of from 5 to 15 g/l for the fibrous material, with customary paper auxiliaries. Conventional paper auxiliaries include, for example, sizing agents, wet strength agents, cationic or anionic retention aids based on synthetic polymers and also dual systems, drainage aids, optical brighteners, defoamers, biocides and paper dyes. These conventional paper additives may be used in the customary amounts.

Useful sizing agents include alkylketene dimers (AKDs), alkenylsuccinic anhydrides (ASAs) and rosin size.

Useful retention aids include for example anionic microparticles (colloidal silica, bentonite), anionic polyacrylamides, cationic polyacrylamides, cationic starch, cationic polyethyleneimine or cationic polyvinylamine. In addition, any desired combinations are conceivable, for example dual systems consisting of a cationic polymer with an anionic microparticle or an anionic polymer with a cationic microparticle. To achieve high filler retention, it is advisable to add such retention aids as can be added for example to thin stuff as well as to thick stuff.

The present invention comprises treating the paper web obtained on treating the paper stock and drainage with from 0.1 to 3 wt %, based on dry paper stock, of at least one starch.

Useful types of starch include virgin starches such as potato, wheat, maize (corn), rice or tapioca starch, of which potato starch is preferable. Chemically modified starches such as hydroxyethyl- or hydroxypropylstarches may similarly be used or else starches comprising anionic groups such as phosphatestarch or else cationized starches comprising quaternary ammonium groups, in which case a degree of substitution DS=0.01 to 0.2 is preferable. The degree of substitution DS indicates the number of cationic groups present on average per glucose unit. Particular preference is given to amphoteric starches comprising not only quaternary ammonium groups but also anionic groups such as carboxylate and/or phosphate groups, which may optionally also be in a chemically modified, for example hydroxylalkylated or alkyl-esterified, state. The starches may be used singly, but also in any desired mixture with one another.

It is preferable to use a digested (degraded) starch. In fully digested starch the granules of starch have fully burst open and the starch is in molecularly disperse form. The average molar masses $M_w$ of a degraded starch are for example in the range from 0.6 million to 8 million daltons, preferably in the range from 1 to 5 million daltons, and more preferably in the range from 1.5 to 4 million daltons.

Degradation may be carried out thermally, which is typically what is meant by cooked starch. Degradation may further be carried out enzymatically. Degradation may finally also be carried out oxidatively. Particular preference is given to using an enzymatically degraded starch.

The coating operation takes place in a film and/or size press or by a no-contact method of application with a spray manifold or curtain coating process.

The coating operation may be carried out using a blade or a die. The sheet of paper preferably has a water content of 60 wt % at the time of coating.

The paper webs obtained according to the present invention are used to produce corrugated fiberboard in a conventional manner. Not only the corrugated central paper ply but also either or both of the outer paper plies may comprise a paper web obtained according to the present invention. Preferably, the paper plies are all three obtained by the process of the present invention.

The corrugated fiberboard obtained according to the present invention is likewise part of the subject matter of the present invention. The corrugated fiberboard of the present invention is very useful in the manufacture of packaging boxes. The manufacture of packaging boxes is effected using conventional methods and conventional machinery.

The process of the present invention leads to corrugated fiberboard possessing improved strength when used in the manufacture of packaging boxes. When corrugated fiberboard is used in the same way for packaging requiring a certain minimum load resistance capability, the corrugated fiberboard of the present invention can be used at reduced grammage compared with the grammage needed for conventional corrugated fiberboard. Furthermore, the corrugated fiberboard of the present invention when used at the same grammage provides packaging boxes manufactured therewith with enhanced load resistance capability compared with the packaging boxes made from conventional corrugated fiberboard.

EXAMPLES

The examples which follow illustrate the present invention. The percentages in the examples are by weight, unless otherwise stated.

The K-value of polymers was determined after Fikentscher, Cellulose-Chemie, volume 13, 58-64 and 71-74 (1932) at a temperature of 20° C. in 5 wt % aqueous sodium chloride solutions at a pH of 7 and a polymer concentration of 0.5%. It is to be noted that K=k×1000.

The following polymers were used in the inventive and comparative examples.

Polymer (A)
Partially hydrolyzed polyvinylformamide (30% degree of hydrolysis) having a K-value of 90.

Polymer (B)
Anionic polymer with the monomer composition of 70 mol % acrylamide and 30 mol % acrylic acid, an $M_w$ of 800 000 g/mol and an anionic charge density of −3.8 meq/g.

Preparation of Starch Solution:
Merizet® 120 maize starch (from Tate & Lyle) was enzymatically degraded as follows: A 12% slurry of Merizet 120 was prepared in hot water at 65° C. under agitation in a 1000 vessel and 0.012% of PL 120 enzyme from Novozyme was added. After 20 minutes, 100 ml of acetic acid were added to the starch solution to terminate the process of starch degradation. The starch solution had a viscosity of 55 mPas at 100 rpm (spindle 2).

Further compounds used as auxiliaries:
retention aid: polyvinylformamide (having a 20% degree of hydrolysis), a K-value of 160 and an anionic charge density of 25 mmol/100 g.
Basoplast® 450 P: 30 wt % solution of an anionic surface-sizing agent (from BASF SE)

Pretreatment of Paper Stock
Paper from 100% waste paper (a mixture of the varieties 1.02, 1.04, 4.01) was beaten with tap water in a pulper at a consistency of 4% until free of fiber bundles and ground in a refiner to a freeness of 40° SR. This stuff was subsequently diluted with tap water to a consistency of 0.8%.

Drainage Testing
One (1) liter of the paper stock described above was used in each inventive and comparative example and was in each case admixed in succession under agitation with the water-soluble polymers each specified in the table and thereafter drained using a Schopper-Riegler drainage tester by measuring the time in seconds for a quantity (filtrate) of 600 ml to pass through. The concentration of polymer A and of polymer B, which were each tested as dry strength agent for paper, was 1% in each case. The results of the measurements are reported in the table.

Base Paper Production and Treatment
The paper stock described above was admixed under agitation and in succession with the polymers specified in table 1 in the inventive and comparative examples. The amounts used in each case (parts by weight) of the polymer solids are reported per 100 parts by weight of waste paper solids.

The polymers (cationic polymer comprising vinylamine units, polymeric anionic compound and the retention aid) were each added to the paper stock in the form of a 1 wt % aqueous solution. The pH of the paper stock was kept at a constant pH7 (using 5% strength sulfuric acid).

Following the last addition of polymers to the paper stock, base papers 2 m in width, 5000 m in length and 133 g/m² in basis weight were produced on a Fourdrinier machine from Voith. The base paper was subsequently size-pressed with a formulation consisting of a starch solution and size at different add-ons of 2.5 to 7 g/m². The size-pressed paper was subsequently dried with contact dryers to a paper moisture content of 5%.

Table 1 hereinbelow summarizes the test liners (TL—outer ply) and corrugated base papers (FL—fluting) produced.

The paper stock treated wtih the polymers gave a Schopper-Riegler value of SR 40 in the drainage test.

Performance Testing of Base Papers
Paper was conditioned for 24 h at 50% relative humidity before the following strength tests were carried out:
 bursting pressure as per DIN ISO 2758 (up to 600 kPa) and DIN ISO 2759 (above 600 kPa)
 SCT as per DIN 54518 (Shortspan compression test)
 CMT as per DIN EN 23035 (Corona medium test)

TABLE 1

Specification of test liners or corrugated base papers

| Example | Polymer A parts by weight of solids | Polymer B parts by weight of solids | Retention aid parts by weight of solids | Starch (solids)/ paper stock (solids) [kg/ton] | Size 0.15 part by weight | Basis weight [g/m$^2$] | Starch/ area [g/m$^2$] |
|---|---|---|---|---|---|---|---|
| RP 1 - TL n.i. | — | — | 0.046 | 50 (5 wt %) | Basoplast 450 P | 140 | 7 |
| RP 2 - FL n.i. | — | — | 0.046 | 50 (5 wt %) | — | 140 | 7 |
| RP 3 - TL n.i. | — | — | 0.046 | 20 (2 wt %) | Basoplast 450 P | 140 | 2.8 |
| RP 4 - FL n.i. | — | — | 0.046 | 20 (2 wt %) | — | 140 | 2.8 |
| CM 1 - TL n.i. | 1.3 | — | 0.023 | 50 (5 wt %) | Basoplast 450 P | 140 | 7 |
| CM 1 - FL n.i. | 1.3 | — | 0.023 | 50 (5 wt %) | — | 140 | 7 |
| CM 2 - TL n.i. | 2.34 | 1.75 | 0.023 | 50 (5 wt %) | Basoplast 450 P | 140 | 7 |
| CM 2 - FL n.i. | 2.34 | 1.75 | 0.023 | 50 (5 wt %) | — | 140 | 7 |
| CM 3 - TL | 1.3 | — | 0.023 | 20 (2 wt %) | Basoplast 450 P | 140 | 2.8 |
| CM 3 - FL | 1.3 | — | 0.023 | 20 (2 wt %) | — | 140 | 2.8 |
| CM 4 - TL | 2.34 | 1.75 | 0.023 | 20 (2 wt %) | Basoplast 450 P | 140 | 2.8 |
| CM 4 - FL | 2.34 | 1.75 | 0.023 | 20 (2 wt %) | — | 140 | 2.8 |
| CM 5 - TL n.i. | 1.3 | — | 0.023 | — | Basoplast 450 P | 136 | — |
| CM 5 - FL n.i. | 1.3 | — | 0.023 | — | — | 136 | — |
| CM 6 - TL n.i. | 2.34 | 1.75 | 0.023 | — | Basoplast 450 P | 136 | — |
| CM 6 - FL n.i. | 2.34 | 1.75 | 0.023 | — | — | 136 | — | n.i. not inventive

Corrugated Fiberboard Production

The corrugated base papers (fluting—FL) were formed to a B flute on a BHS board machine. Corrugated fiberboard production took place using Cargill 208 B 7 size, a speed of 125 m/min and a surface temperature of 63° C. for outer 1 and outer 2. Size add-on was 2.5 g/m$^2$ in each case. Each run produced 2500 m of B flute. The corrugated fiberboard consists of the two outer layers (test liner A and test liner B with the flute in between).

Table 2 shows the composition of the corrugated fiberboards from the above-described test liners and corrugated base papers. The test liners in question were produced twice under the same conditions (test liner-A and test liner-B).

TABLE 2

Examples of corrugated fiberboard

| Example | Composition of corrugated fiberboard | | | Comment[1] |
|---|---|---|---|---|
| 1 n.i. | RP 1 TL - A | RP 2 FL | RP 1 TL - B | 5 wt % of starch |
| 2 n.i. | RP 3 TL - A | RP 4 FL | RP 3 TL - B | 2 wt % of starch |
| 3 n.i. | CM 1 - TL - A | CM 1 - FL | CM 1 - TL - B | Polymer A 5 wt % of starch |
| 4 n.i. | CM 2- TL - A | CM 2 - FL | CM 2 - TL - B | Polymer A Polymer B 5 wt % of starch |
| 5 | CM 3 - TL - A | CM 3 - FL | CM 3 - TL - B | Polymer A 2 wt % of starch |
| 6 | CM 4 - TL - A | CM 4 - FL | CM 4 - TL - B | Polymer A Polymer B 2 wt % of starch |
| 7 n.i. | CM 5 - TL - A | CM 5 - FL | CM 5 - TL - B | Polymer A 0% of starch |
| 8 n.i. | CM 6 - TL - A | CM 6 - FL | CM 6 - TL - B | Polymer A Polymer B 0% of starch | n.i.: not inventive
[1] the starch quantity is starch (solids) based on paper stock (solids)

Fefco Standard Box Production

The B flute corrugated fiberboard was formed in an in-line plotter and stamping machine from Meier at 30 m/min into Fefco standard boxes having the formats 30×20×10 cm (type A), 40×30×20 cm (type B) and 50×40×30 cm (type C).

Strength Tests on Standard Box from Corrugated Fiberboard:

The sample materials to be tested were conditioned at 23° C. and 50% relative humidity to constant weight (for at least 24 h) before testing. Sample preparation was carried out as per the standard. The flat corrugated fiberboard boxes were uprighted and sealed with adhesive tape at the bottom and top flaps. Performance measurements for ECT and FCT were each carried out on 10 individual specimens (in conformity with the standard). The result reported is the mean from 10 measurements.

ECT edge crush resistance to DIN EN ISO 3037

FCT flat crush resistance to DIN EN ISO 3035

On the corrugated fiberboard boxes:

BCT box crush resistance to DIN 55440. BCT was determined as per said DIN standard for box types A, B and C.

The BCT measurements were carried out on 10 boxes in each case in conformity with the standard. The result reported is the mean from 10 measurements plus the related standard deviation.

Table 3 summarizes the performance test results of the treated base papers and the corrugated fiberboard box manufactured therefrom. The values reported for the treated base papers are the values of the test liner.

TABLE 3

| Example Strength agent and starch content[1] | SCT [kN*m$^2$/g] | CMT [N*m$^2$/g] | Burst [kPa*m$^2$/g] | BCT - N Type A | BCT - N Type B | BCT - N Type C | ECT [kN/m] | FCT [kPa] |
|---|---|---|---|---|---|---|---|---|
| Example 1 n.i. 100% starch | 1.85 | 1.69 | 2.29 | 2407 | 2398 | 2443 | 5.37 | 322 |

TABLE 3-continued

| Example Strength agent and starch content[1] | SCT [kN*m²/g] | CMT [N*m²/g] | Burst [kPa*m²/g] | BCT - N Type A | BCT - N Type B | BCT - N Type C | ECT [kN/m] | FCT [kPa] |
|---|---|---|---|---|---|---|---|---|
| Example 2 n.i. 2 wt % of starch | 1.7 | 1.61 | 2.17 | 2128 | 2255 | 2399 | 4.87 | 326 |
| Example 3 n.i. Polymer A 5 wt % of starch | 2 | 2.16 | 2.87 | 2707 | 2593 | 2669 | 6.06 | 448 |
| Example 5 Polymer A, 2 wt % of starch | 1.82 | 2.05 | 2.53 | 2128 | 2405 | 2439 | 5.88 | 411 |
| Example 7, n.i. Polymer A 0% starch | 1.9 | 2 | 2.59 | 2027 | 2151 | 2282 | 4.95 | 394 |
| Example 4 n.i. Polymer A, Polymer B 5 wt % of starch | 2.05 | 2.38 | 2.9 | 2563 | 2520 | 2611 | 6.36 | 424 |
| Example 6 Polymer A, Polymer B, 2 wt % of starch | 1.86 | 2.12 | 2.7 | 2408 | 2377 | 2439 | 5.59 | 438 |
| Example 8 n.i. Polymer A, Polymer B, 0% starch | 1.9 | 2.2 | 2.82 | 2262 | 2532 | 2402 | 5.95 | 474 | n.i.: not inventive
[1]the starch quantity is starch (solids) based on paper stock (solids)

As is evident from the results in table 3, the use of polymer A combined with polymer B (Example 6) or polymer A (Example 5) while at the same time reducing the starch add-on from 50 kg/ton to 20 kg/ton provides comparable corrugated fiberboard strengths to the use of starch as sole strength agent.

We claim:

1. A process for producing corrugated fiberboard from plies of paper which each have a grammage of 70 to 200 g/m² and of which at least one ply of paper is obtained by a process comprising:
    the addition of
    (A) 0.25 to 5 wt %, based on dry paper stock, of at least one cationic polymer comprising vinylamine units, and
    (B) 0 to 5 wt %, based on dry paper stock, of at least one polymeric anionic compound,
    to a paper stock;
    draining the paper stock by sheet formation;
    coating a paper web obtained with
    (C) 0.1 to 3 wt %, based on dry paper stock, of at least one starch, to obtain a coated paper web; and
    drying the coated paper web,
    wherein:
    the polymeric anionic compound is selected from the group consisting of a polymeric anionic compound (B1) and a polymeric anionic compound (B2); and
    the polymeric anionic compound (B1) is obtained by copolymerizing a monomer mixture comprising
    (a) at least one monomer selected from the group consisting of acrylamide and an N-vinylcarboxamide of the formula

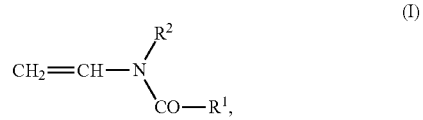

where $R^1$ and $R^2$ are each H or $C_1$ to $C_6$ alkyl;
    (b) at least one acid-functional monoethylenically unsaturated monomer, an alkali metal, alkaline earth metal or ammonium salt thereof, or a mixture thereof;
    (c) optionally one or more monoethylenically unsaturated compounds other than said monomers (a) and (b); and
    (d) optionally one or more compounds having at least two ethylenically unsaturated double bonds in the molecule; and
    the polymeric anionic compound (B2) is a hydrolysis product of the polymeric anionic compound (B1) whose carboxamide moieties have been partly or wholly hydrolyzed into amino groups.

2. The process according to claim 1, wherein the cationic polymer comprising vinylamine units is obtained by:

polymerizing:
(a) at least one monomer of the formula

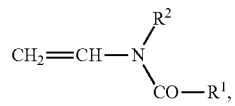
(I)

where $R_1$ and $R^2$ are each H or $C_1$ to $C_6$ alkyl,
(c) optionally one or more monoethylenically unsaturated monomers other than said monomers (a), and
(d) optionally one or more compounds having at least two ethylenically unsaturated double bonds in the molecule; and then
partially or completely hydrolyzing the monomer (I) units polymerized into the polymer, to form amino groups, and/or
the cationic polymer comprising vinylamine units is obtained by Hofmann degradation of polymers having acrylamide units, methacrylamide units, or both.

3. The process according to claim 1, wherein the cationic polymer comprising vinylamine units is polyvinylamine or an at least 10 mol % hydrolyzed homopolymer of N-vinylformamide.

4. The process according to claim 1, wherein the polymeric anionic compound is obtained by polymerizing a monomer mixture comprising:
(a) at least one monomer selected from the group consisting of acrylamide and an N-vinylcarboxamide of the foimula

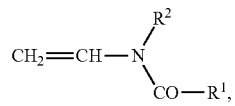
(I)

where $R_1$ and $R^2$ are each H or $C_1$ to $C_6$ alkyl;

(b) at least one acid-functional monoethylenically unsaturated monomer, an alkali metal, alkaline earth metal or ammonium salt thereof, or a mixture thereof;
(c) optionally one or more monoethylenically unsaturated monomers other than said monomers (a) and (b); and
(d) optionally one or more compounds having at least two ethylenically unsaturated double bonds in the molecule.

5. The process according to claim 1 wherein the polymeric anionic compound is obtained by polymerizing a monomer mixture comprising:
(a1) N-vinyl fonnamide;
(b1) acrylic acid, methacrylic acid, alkali metal or ammonium salts thereof, or a mixture thereof: and
(c1) optionally one or more monoethylenically unsaturated monomers other than the monomers of groups (a) and (b).

6. The process according to claim 1, wherein the polymeric anionic compound is an anionic copolymer of acrylamide.

7. The process according to claim 1, wherein the polymeric anionic compound is obtained by copolymerizing a monomer mixture comprising:
(a1) acrylamide;
(b1) acrylic acid, methacrylic acid, alkali metal or ammonium salts thereof, or a mixture thereof; and
(c1) optionally one or more monoethylenically unsaturated monomers other than the monomers of groups (a) and (b).

8. The process according to claim 1, wherein the paper web obtained is coated with an enzymatically degraded starch.

9. A corrugated fiberboard obtained by the process of claim 1.

10. A method, comprising manufacturing a packaging box with the corrugated fiberboard of claim 9.

* * * * *